March 19, 1957 F. S. MACKLEM ET AL 2,785,941

LOW-INERTIA PLOTTING-BOARD DRIVE

Filed Nov. 12, 1953 2 Sheets-Sheet 1

INVENTORS
F. SAUTHERLAND MACKLEM
and FRANK G. WILLEY

BY [signature]
Walter S. Paul.
ATTORNEYS

LOW-INERTIA PLOTTING-BOARD DRIVE

Filed Nov. 12, 1953

2 Sheets-Sheet 2

INVENTORS
F. SAUTHERLAND MACKLEM and
FRANK. G. WILLEY

BY
Walter S. Paul
ATTORNEYS 2,785,941

LOW-INERTIA PLOTTING-BOARD DRIVE

F Sutherland Macklem, Valley Stream, and Frank G. Willey, New Hyde Park, N. Y., assignors, by mesne assignments, to the United States of America as represented by the Secretary of the Navy Application November 12, 1953, Serial No. 391,779

13 Claims. (Cl. 346—8)

This invention relates to an electro-mechanical computer adapted to calculate the planar components of motion of a relatively moving body.

In the past, it has been customary to drive the stylus of a plotting board, such as used for maritime or air navigation, either strictly in accordance with rectangular components or strictly in accordance with polar components, depending on the nature of the plot. These systems have been complicated, have required considerable adjustment, and have been delicate.

It is, therefore, an object of this invention to provide a low-inertia drive for a plotting-board stylus which will be simple, rugged, accurate and which will require no adjustment.

It is another object of this invention to provide a low-inertia drive for a plotting-board stylus employing two motors, each motor providing a diagonal component of motion.

Still another object of this invention is the achievement of a low-inertia drive of a plotting-board stylus through the selective employment of two motors, each providing a diagonal component of motion.

In accordance with this invention, a low-inertia drive of the plotting stylus is achieved through the selective differential employment of two motors, each providing what may be termed "diagonal components of motion." Thus, to produce a single-coordinate motion in a rectangular coordinate plot, both motors will be operated at the same speed; if the motors are driven in the same direction, a first pure single coordinate motion of a rectangular system results, and if the motors are driven in opposition at the same speed, the other pure single coordinate motion is achieved in the same rectangular coordinate system.

The invention is embodied in four forms, which are separately shown in Figures 1 to 4 of the accompanying drawings, to which reference will now be had for a better understanding of the invention.

Figure 1:
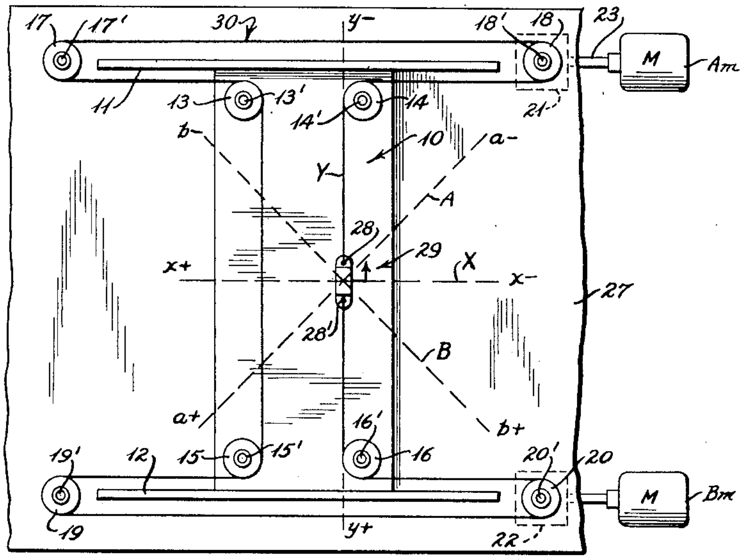

Referring to Figure 1 of the drawings, the mechanism shown employs a frame, such as a table top, or other suitable mounting means 27. Securely mounted on the frame 27 are spaced parallel guide ways 11 and 12. A single slide 10 spans one dimension of the plotting surface and is guided at both ends by the parallel guide ways 11 and 12 at opposite margins of the plotting surface. At each corner of the slide 10 idler pulleys 13, 14, 15, and 16 are rotatably mounted on fixed shafts 13', 14', 15', and 16' respectively. Further, the pulleys 17, 18, 19, and 20 are rotatably mounted on shafts 17', 18', 19', and 20' which are fixedly secured to the frame near the respective corners of the plotting surface. A single length of cable 30 is stretched over all the pulleys and a stylus 29 is clamped at 28 and 28' to the cable span between the pulleys 14 and 16. The pulley 18 is driven by a servo motor A*m* which is coupled to the pulley through shaft 23, reduction gears 21 and shaft 18'. The shaft 24, reductions gears 22 and shaft 20' similarly couple the pulley 20 to a servo motor B*m*. The servo motors A*m* and B*m* are located below the top of the frame. Although it forms no part of the present invention, it is to be understood that the servo motors A*m* and B*m* are energized by signals produced in response to displacement in miles or velocity of the object being plotted.

With the described construction, it will be seen that if the motor A*m* alone is driven, so that the pulley 18 becomes a driving pulley, while the motor B*m* is held against rotation, so that the pulley 20 constitutes a brake load, the pulleys 14 and 16 will receive the tension of the cable 30 causing the slide to move to the right while the stylus moves upwardly. The pulleys 13 and 15 receive the slack of the cable and keep the cable taut. Thus, it is apparent that the stylus will be caused to follow what may be termed a diagonal component path, as indicated by the dash line A. For a counterclockwise direction of rotation of the motor A*m*, the stylus will travel along the dashed line A in the direction of $a-$, and for clockwise direction of rotation along the dashed line A in the direction of $a+$. Likewise, for the case of the motor B*m*, when motor A*m* is held against rotation so that pulley 18 constitutes a brake load clockwise rotation of motor B*m* will cause the stylus to travel along the line B in the direction of $b+$, while counterclockwise rotation will cause the stylus to move along the line B in the direction of $b-$. Furthermore, if both motors A*m* and B*m* are driven at the same speed in a clockwise direction, it is obvious that the stylus will travel along the line Y in the direction of $y+$, while if both motors are rotated in a counterclockwise direction, the stylus will travel along the line Y in the direction of $y-$. If, however, the motors are driven in opposite directions, the stylus motion will be determined along the line X in the direction of $x+$ if motor A*m* is driven clockwise while motor B*m* is driven counterclockwise, and in the direction of $x-$ if the direction of rotation of each motor is reversed.

It is obvious, therefore, that any intermediate direction of travel of the stylus will result by varying the relative speeds of the motors.

Figure 2:
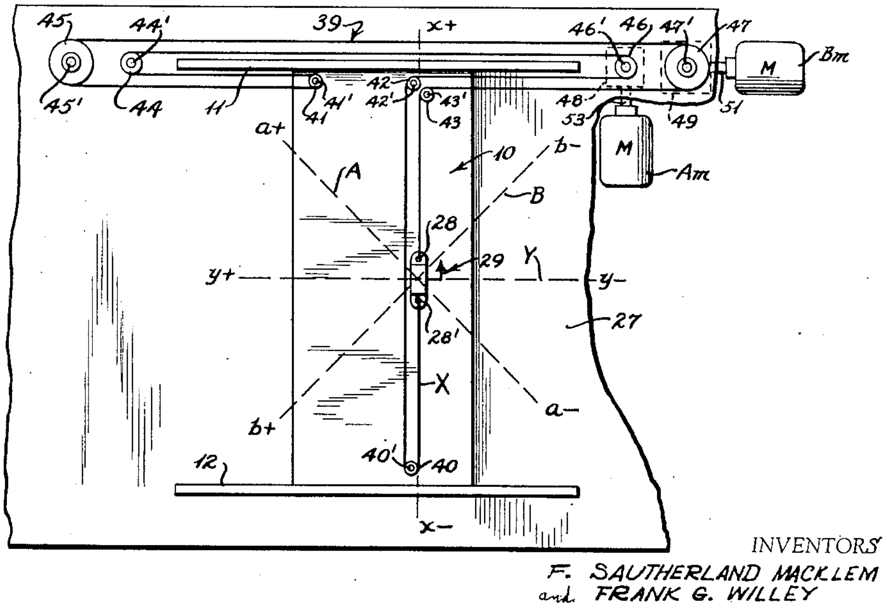

The structure of Figure 2 represents, in a sense, a simplification over the structure of Figure 1, in that the pulleys 44, 45, 46 and 47, mounted on the fixed shafts 44', 45', 46' and 47' are all positioned along one margin of the plotting board frame 27. The guide 10 may resemble a T-square in that a single guideway 11 may suffice. It is considered preferable, however, to provide the second guide 12, as shown. Four pulleys 40, 41, 42, 43, mounted on their respective shafts 40', 41', 42', 43', are carried on the slide 10, but only the pulley 40 is mounted at the distant side of the plotting surface, while the other three pulleys are mounted near the drive end. As before, the stylus 29 is clamped at 28 and 28' to a span of the cable 39 which is stretched around the pulleys as shown. The two servo motors A*m*, B*m*, are connected, respectively, to the pulleys 46, 47, through shafts 53 and 51. The nature of the drive provided by the motors A and B to the stylus 29 is exactly the same as that described for Figure 1. Thus, when motor A*m* is rotated clockwise, while motor B*m* is stationary, the stylus will travel along the line A in the direction of $a+$. When the motor A*m* is rotated counterclockwise, the stylus will travel along the line A in the direction of $a-$. Similarly, when the motor B*m* is rotated clockwise, the stylus will travel along the line B in the direction of $b+$, whereas when rotated counterclockwise, the stylus will travel along the line B in the direction of $b-$. With both motors running in the same direction of rotation, the stylus will travel along line Y in the direction of $y+$ or $y-$, depending on the sense of rotation of the motors. With the motors rotating in opposite directions, the stylus will travel along the line X in a direction depending upon the sense of rotation of the motors.

Figure 3:
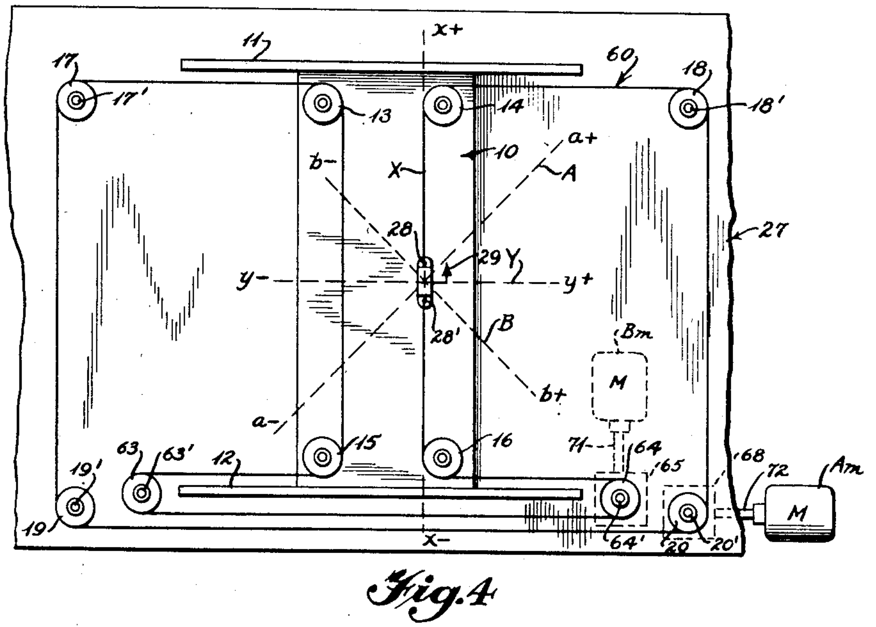

The structure of Figure 3 represents a refinement of Figure 1, wherein the addition of pulleys 63 and 64 mounted on fixed shafts 63' and 64' on the frame 27 permits physical placement of both servo motors at the lower right corner of the structure, for design convenience. As in Figure 1, the pulleys 13, 14, 15, and 16 are mounted on the slide 10, and the pulleys 17, 18, 19, and 20 are mounted at the corners of the frame. In this case, the motor A*m* is coupled to the pulley 20 through shafts 72 and reduction gears 68, while the motor B*m* is coupled to the pulley 64 through shaft 71 and reduction gears 65. The cable 60 is routed around each of the pulleys as shown in the drawing.

Figure 4:
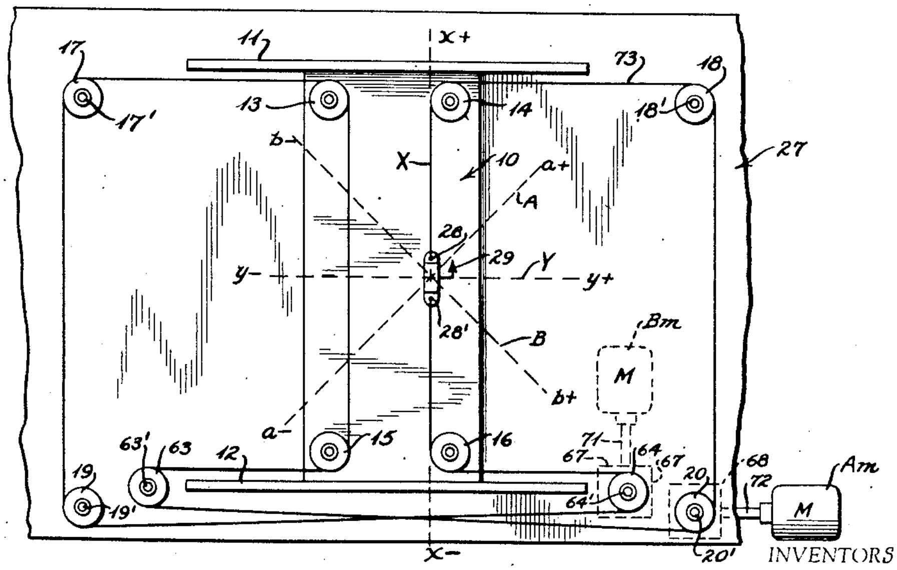

The arrangement of the pulleys shown in Figure 4 is identical with that shown in Figure 3. The structure of Figure 4 is an improvement over Figure 3 by reason of the different routing of the cable 73, whereby stresses incident to sudden accelerations of either or both drive motors tend less to distort the rectangular relationship of the slide 10 to the guides 11 and 12.

The movement of the stylus shown in Figures 3 and 4 along the lines A, B, X, and Y in the plus or minus direction due to the clockwise or counterclockwise rotation of either or both of the servo motors A*m* or B*m* is exactly the same as that of the movement explained in the description of Figures 1 and 2, careful note being made of the direction of the lines A, B, X, and Y in each one of the figures.

Although certain preferred embodiments of my invention have been illustrated and described herein, it is to be understood that the invention is not limited thereby, but is susceptible of changes in form and detail within the scope of the appended claims.

We claim:

1. A plotting board drive comprising a slide, support means mounting said slide for lateral motion in a single plane, means for moving said slide in one direction comprising a drive pulley and a brake pulley on said mounting means, a closed cable constrained around said pulleys, idler pulleys mounted in spaced relation on said slide in line between said support means, a portion of said cable frictionally engaging said idler pulleys, plotting means mounted on said cable at a point intermediate said idler pulleys, means for rotating said drive pulley, and means for restraining said brake pulley.

2. The invention as defined in claim 1, and pulley means for taking up the slack of said cable due to motion of said slide.

3. The invention as defined in claim 2, wherein the means for rotating said drive pulley is a first motor and the means for restraining said brake pulley is a second motor.

4. The invention as defined in claim 2 wherein said pulley means for taking up slack comprises at least one idler pulley mounted on said slide, and at least one other idler pulley mounted on said support, said one and other idler pulleys being engaged by said cable.

5. A plotting board comprising a frame, a slide arranged for reciprocatory motion on said frame, slide actuating pulleys on said slide, a closed cable constrained around said pulleys, a stylus mounted on a portion of said cable normal to the line of motion of said slide, and means imparting a diagonal component of motion to said stylus comprising drive means engaging a portion of said cable for imparting motion to a portion of said cable and brake means for another portion of said cable for exerting a force on said pulleys thereby imparting motion to said slide, whereby the motion of said stylus is the resultant of the motion of said cable and the motion of said slide.

6. The invention as defined in claim 5 and means for taking up the slack of said cable due to motion of the slide.

7. In a plotting board, a slide, means mounting said slide for reciprocatory motion, means for displacing said slide in one direction comprising a drive pulley and a brake pulley, a closed cable entrained around said pulleys, a slide actuating pulley carried by said slide and having a portion of the cable between said drive and brake pulleys engaged therewith so that in response to actuation of said drive pulley, the effective length of said cable portion is decreased thereby exerting a slide displacing force on said pulley, and plotting means carried by a cable portion above said slide, the motion of said plotting means being variable in response to the effectiveness of said brake pulley and the rotation of said drive pulley.

8. In a plotting board drive, a base board, slide supports mounted on said base board provided with slide engaging connections, a slide having slide contacts engageable with said slide connections for slideable movement therein, a pair of pulleys mounted in spaced relation on said slide in line transverse to the direction of slide movement, a cable engaging said pulleys, a stylus mounted on said cable adapted to contact the surface of said slide, and means imparting a diagonal component of motion to said stylus including a fixed motor driven pulley mounted on said base board and engaging said cable and means for directly engaging and restraining motion of a portion of said cable.

9. A plotting board drive comprising a base board, two parallel spaced supports mounted on said board, a slide having support engaging ends movable on and between said supports, spaced first and second pairs of slide actuating idler pulleys mounted on said slide, each pair extending at right angles to said supports and the line of slide movement, first, second, third and fourth spaced pulleys mounted on said board along one of said supports, the first and second pulleys being drive pulleys, fifth and sixth spaced pulleys mounted on said board parallel to the other of said supports, the fifth pulley being in line with the first pulley beyond one end of said other slide supports, a cable engaging said pulleys and running from said first pulley to said fifth pulley, and around the pair of idler pulleys on the end adjacent to the first and fifth pulleys, thence to and around the second pulley, the third pulley, the second pair of slide idler pulleys, the sixth pulley, the fourth pulley and back to said first pulley to form a closed loop, a plotting device mounted on a portion of said cable between one of the pairs of slide actuating idler pulleys, and reversible drive means for said drive pulleys, each of said drive means serving at will as a brake for said cable.

10. A plotting board drive comprising a base board, two parallel spaced supports mounted on said board, a slide having support engaging ends movable on and between said supports, spaced first and second pairs of slide actuating idler pulleys mounted on said slide, each pair extending at right angles to said supports and the line of slide movement, first, second, third and fourth spaced pulleys mounted on said board along one of said supports, the first and second pulleys being drive pulleys, fifth and sixth spaced pulleys mounted on said board parallel to the other of said supports, the fifth pulley being in line with the first pulley beyond one end of said other slide supports, a cable engaging said pulleys and running from said first pulley to said fifth pulley, and around the pair of idler pulleys on the end adjacent to the first and fifth pulleys, thence to and around the second pulley, the fourth pulley, the sixth pulley, the second pair of slide idler pulleys, the third pulley and back to said first pulley to form a closed loop, a plotting device mounted on a portion of said cable between one of the pairs of slide actuating idler pulleys, and reversible drive means for said drive pulleys, each of said drive means serving at will as a brake for said cable.

11. A plotting board drive comprising a base board, two parallel spaced supports mounted on said board, a slide having support engaging ends movable on and between said supports, first and second slide pulleys mounted of said slide adjacent one end and one transverse edge thereof, a third slide pulley mounted on said slide at said one end but adjacent the other transverse edge thereof, a fourth slide pulley mounted at the other end of said slide transversely opposite to said first slide pulley, first, second, third and fourth board pulleys mounted in alinement on said board, the first and second board pulleys being adjacent one end of one of said supports and the third and fourth board pulleys being adjacent the other end of said one support, a cable engaging said pulley's and extending in order from said first board pulley, to said fourth board pulley, to said third slide pulley, to said fourth slide pulley, to said third board pulley, to said second board pulley, to said second slide pulley, to said fourth slide pulley, to said first slide pulley, to said first board pulley, a plotting device secured to said cable between the first and fourth slide pulleys, and reversible drive means attached to each of said first and second board pulleys, either one of said drive means serving as a brake means when the other drive means is driving.

12. The invention as defined in claim 8 wherein said cable comprises a closed loop.

13. The invention as defined in claim 12 and additional means for taking up slack in said cable.

References Cited in the file of this patent

UNITED STATES PATENTS

| | | |
|---|---|---|
| 2,395,351 | Sohn | Feb. 19, 1946 |
| 2,492,148 | Herbold | Dec. 27, 1949 |
| 2,675,291 | Webster | Apr. 13, 1954 |